United States Patent [19]
Huey et al.

[11] 3,870,925
[45] Mar. 11, 1973

[54] EARTH GRID

[75] Inventors: Richard Meredith Huey, Sydney;
Krishna Rajaratnam, Wollongong, both of New South Wales, Australia

[73] Assignee: Unisearch Limited, Sidney, New South Wales, Australia

[22] Filed: May 1, 1974

[21] Appl. No.: 465,930

[30] Foreign Application Priority Data
May 4, 1973  Australia............................ 3206/73

[52] U.S. Cl..................... 317/9 R, 174/6, 317/103
[51] Int. Cl. ............................................ H02b 1/16
[58] Field of Search ............... 174/5 SG, 6; 307/94; 317/9 R, 103

Primary Examiner—Laramie E. Askin
Attorney, Agent, or Firm—Dorfman, Herrell and Skillman

[57] ABSTRACT

An earth grid for the switching yards and distribution yards associated with electric power stations and substations is provided in which the conductors of the interconnected mesh of conductors forming the grid are aligned at an angle of between 30° and 60° with the direction of the switching yard bus bars and feeders.

4 Claims, 1 Drawing Figure

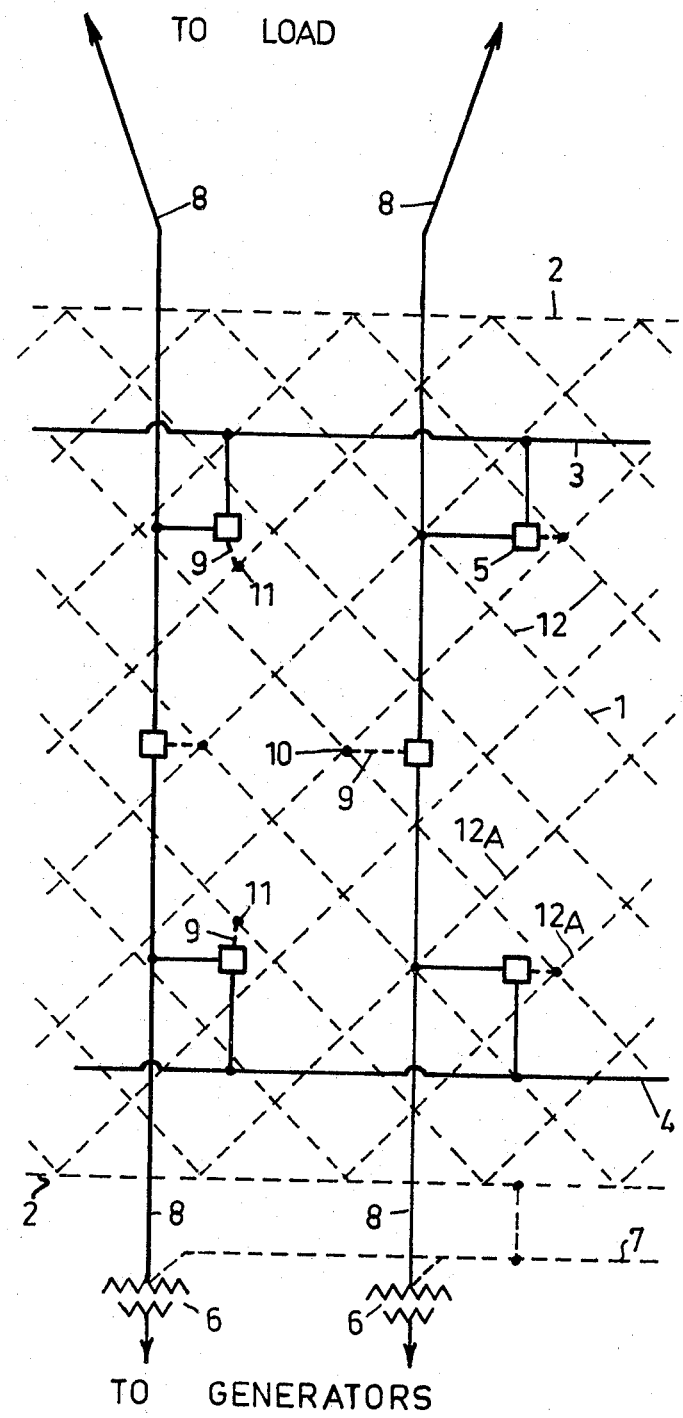

EARTH GRID

The present invention relates to earth grids for the switching yards, distribution yards and the like associated with electric power stations, sub-stations and distribution systems.

In such switching yards there are normally arranged a number of bus bars or supply rails and other active conductors. The bus bars are located above the ground and are supported by, and insulated from, metal towers or other electrically conductive structures. There may be one or more layers of bus bars located on the towers at different heights from the ground.

The individual bus bars within any given layer are generally aligned perpendicular to the feeders feeding to or fed from them.

The towers supporting the bus bars, the supports for circuit breakers and transformers, and other electrically conductive structures within the switch yard are generally required to be connected to, and held at, earth potential, for if this were not the case, in the event of a fault — due to a breakdown in the electrical insulation between a tower and a bus bar for example — the structures would then be electrically active and thereby constitute a safety hazard.

The connection of the structures to earth potential is achieved by means of an earth grid. The earth grid is an inter-connected mesh of conductors which is connected to the individual structures within the yard by means of short connectors termed earth risers. The earth grid is itself (in the case of a power station) connected ultimately to the neutral terminals of the transformers that supply the fault current to earth.

The earth grid is usually buried a short distance under the ground of the switch yard and thus the conductors of the earth grid are required to be made of a non-corrodible material of good electrical conductivity such as copper.

In addition, there is generally provided overhead earth conductors consisting of earthed conductors located at the top of the bus bar supporting towers above the uppermost bus bars and oriented in the same direction as the active conductors (feeders). The overhead earth conductors are electrically connected to the towers as well as the earth grid which because of its construction affords the bus bars and feeders some measure of protection from lightning strikes.

In conventional earth grids the conductors within the grid are connected into a rectangular mesh, the directions of alignment of the earth grid conductors being the same as the possible directions of alignment of the bus bars and feeders.

In the event of a fault occurring within the switch yard, a large fault current flows. The maximum magnitude of the fault current is known for a given electric power station switching yard and the time of duration of the flow of a fault current can be predetermined.

Accordingly the cross-sectional area required of a conductor that has to carry the full fault current without damage is known.

In a conventional earth grid the path taken by the fault current and the division of the fault current amongst the possible conductive paths available to it are not known so that each conductor of the earth grid must be provided with a cross-sectional area sufficient to carry the undivided maximum predetermined fault current.

In modern power stations the area of a switching yard often exceeds several hectares so the cost of the material required for the conductive members of the earth grid is a major component of the cost of the completed earth grid. Accordingly, any reduction in the necessary cross-sectional area of the conductive members of an earth grid would create significant savings in the construction of the earth grid.

It is an object of the invention to devise an earth grid in which the current flowing through any individual conductor in the grid is reduced and this object is achieved according to the present invention by an earth grid, for earthing electrically conductive structures associated with at least one array of parallel bus bars or feeders or a plurality of such arrays arranged at right angles to each other, comprising a horizontal planar substantially regular parallelogrammatic mesh formed by two intersecting and interconnected sets of mutually parallel earth grid conductors and a plurality of electrically conductive earth risers, one or more of said earth risers being connected to each said structure from said mesh and said mesh being electrically connected to a neutral point associated with said bus bars or feeders and/or earth, wherein the mutually parallel earth grid conductors of each said set are oriented in a direction forming an angle of between thirty and sixty degrees with the direction of said bus bars or feeders. One embodiment of the invention will now be described in more detail with reference to the drawing which shows a schematic wiring layout of a portion of a switching yard at a power station.

In the drawing a part of an earth grid 1 is formed by a plurality of interconnected conductors 12 and 12A and is represented by dashed lines to indicate that the actual conductors are buried within the ground. The edges of the earth grid are formed by a peripheral conductive member 2 which completely surrounds the earth grid 1.

Located above ground level are a main bus bar 3 and a generator bus bar 4 which could be triple bars for three phase systems. The main bus bar 3 and generator bus bar 4 are connected through circuit breakers 5 to each of a plurality of (three phase) feeders 8 of which two are shown. The feeders 8 are positioned above the main bus bar 3 and the generator bus bar 4 and there will be as many feeders 8 as there are generators in the power station. The feeders 8 are connected to the generators through transformers 6. The metal structure of each transformer 6 is connected to an earthing conductor 7 to which the earth grid 1 is also connected. The earthing conductor 7 is ultimately connected to the neutral point of each of the generators.

The main bus bar 3, the generator bus bar 4 and the feeders 8 are held above ground level by towers (not shown). These towers, the supports for the circuit breakers 5 and any other electrically conductive structures within the switching yard are connected to the earth grid 1 by earth risers. The circuit breakers 5 are connected to the earth grid 1 by earth risers 9 which join the earth grid 1 at junctions 10 of the conductors 12 and 12A or at the centre 11 of an earth grid conductor. The earth risers to the other structures are similarly connected.

In the event of a fault developing in the switching yard, a large fault current will flow through some of the feeders 8 and/or bus bars 3, 4 to the earth grid 1.

As a result of the orientation of the earth grid 1 relative to the main bus bar 3, the generator bus bar 4, and the feeders 8, the fault current is now unable to flow in the earth grid 1 along a path parallel to those bus bars and feeders carrying the fault current. Such a parallel path of flow is disadvantageous as it would have a minimum of inductance associated with it. The orientation of the grid ensures that the current is divided between a number of conductors thereby decreasing the proportion of the maximum fault current each earth grid conductor would be required to conduct.

The abovementioned location of the connection between the earth risers 9 and the earth grid 1 also ensures that the fault current is more equitably distributed amongst the earth grid conductors. As the amount of current each earth grid conductor is required to conduct is reduced, the cross-sectional area of each earth grid conductor can also be reduced, and an attendant saving in cost is thereby created.

As the maximum fault current will flow through the earth risers 9 and at least some portion of the peripheral member 2, both these conductors cannot have a reduced cross-sectional area. Also where practical constructional requirements prevent the connection of an earth riser to a junction of the earth grid conductors, the connection must be made to some other point on the conductor and thus a section of this conductor cannot have a reduced cross-sectional area.

The preferred angle between the earth grid conductors and the direction of the bus bars 3 and 4 and of the feeders 8 is 45°. However angles between 30° and 60° will also result in the fault current being split between the earth grid conductors.

It is to be understood that the earth grid conductors may be diverted, from the otherwise rectangular parallelogrammatic mesh, to allow for the foundations of the bus bar supporting towers and other structures located within the earth grid.

The foregoing describes only one embodiment of the present invention and various modifications, obvious to those skilled in the art, may be made thereto without departing from the scope of the present invention.

We claim:

1. An earth grid, for earthing electrically conductive structures associated with at least one array of parallel bus bars of feeders, or a plurality of such arrays arranged at right angles to each other, said earth grid comprising a horizontal planar substantially regular parallelogrammatic mesh formed by two intersecting and interconnected sets of mutually parallel earth grid conductors and a plurality of electrically conductive earth risers, one or more of said earth risers being connected to each said structure from said mesh and said mesh being electrically connected to a neutral point associated with said bus bars or feeders and/or earth wherein the mutually parallel earth grid conductors of each said set are oriented in a direction forming an angle of between thirty and sixty degrees with the direction of said bus bars or feeders.

2. The earth grid as claimed in claim 1 wherein at least some of said earth risers are joined to said grid conductors at a point of interconnection between at least two grid conductors.

3. The earth grid as claimed in claim 1 wherein at least some of said earth risers are joined to said grid conductors midway between the points of interconnection of said grid conductors.

4. The earth grid as claimed in claim 1 wherein said angle is 45°.

* * * * *